(12) United States Patent
Vogel et al.

(10) Patent No.: US 10,898,984 B2
(45) Date of Patent: Jan. 26, 2021

(54) ACCOMMODATING ASSEMBLY FOR THE GRINDING OF A CAMSHAFT AND METHOD FOR GRINDING THE CAMSHAFT

(71) Applicant: ThyssenKrupp Presta TecCenter AG, Eschen (LI)

(72) Inventors: Immo Vogel, Lindau/Bodensee (DE); Franz Salzgeber, Mauren (LI)

(73) Assignee: ThyssenKrupp Presta TecCenter AG, Eschen (LI)

( * ) Notice: Subject to any disclaimer, the term of this patent is extended or adjusted under 35 U.S.C. 154(b) by 548 days.

(21) Appl. No.: 15/100,573

(22) PCT Filed: Dec. 3, 2014

(86) PCT No.: PCT/EP2014/003220
§ 371 (c)(1),
(2) Date: May 31, 2016

(87) PCT Pub. No.: WO2015/082066
PCT Pub. Date: Jun. 11, 2015

(65) Prior Publication Data
US 2016/0297050 A1    Oct. 13, 2016

(30) Foreign Application Priority Data
Dec. 4, 2013 (DE) .................. 10 2013 113 444

(51) Int. Cl.
*B24B 19/12* (2006.01)
*B24B 41/06* (2012.01)
(Continued)

(52) U.S. Cl.
CPC .............. *B24B 19/12* (2013.01); *B24B 5/42* (2013.01); *B24B 5/421* (2013.01); *B24B 41/06* (2013.01); *F16H 53/025* (2013.01)

(58) Field of Classification Search
CPC .......... B24B 5/42; B24B 5/421; B24B 19/12; B24B 41/06; F16H 53/025
(Continued)

(56) References Cited

U.S. PATENT DOCUMENTS 3,452,487 A * 7/1969 Piasecki .................. B24B 41/06
451/385
4,660,269 A * 4/1987 Suzuki ..................... F01L 1/047
29/523
(Continued)

FOREIGN PATENT DOCUMENTS

CN       101072660 A     11/2007
DE       3609409 C1 * 10/1987 ............. B23Q 1/267
(Continued)

OTHER PUBLICATIONS

International Search Report for PCT/EP2014/003220 dated Feb. 16, 2015 (dated Feb. 25, 2015).

*Primary Examiner* — Eileen P Morgan
(74) *Attorney, Agent, or Firm* — thyssenkrupp North America, LLC

(57) ABSTRACT

Receiving arrangements for receiving camshafts and methods for grinding machining camshafts may be used with camshafts that have a shaft body that extends along an axis of rotation and includes functional elements. A gearwheel may be mounted on the shaft body, wherein a receiving body is provided, by means of which the camshaft can be at least partially received for purposes of performing a grinding machining process. The gearwheel may include a receiving means onto which the receiving body can be engaged and by way of which it is made possible for the camshaft to be received by the receiving body.

16 Claims, 1 Drawing Sheet

(51) Int. Cl.
  *B24B 5/42* (2006.01)
  *F16H 53/02* (2006.01)
(58) Field of Classification Search
  USPC .................................................. 451/398, 399
  See application file for complete search history.

(56) References Cited

U.S. PATENT DOCUMENTS

| | | | | |
|---|---|---|---|---|
| 4,800,683 | A * | 1/1989 | Schwar | B24B 19/12 |
| | | | | 451/15 |
| 4,934,882 | A * | 6/1990 | Phillips | B23B 33/00 |
| | | | | 279/111 |
| 5,975,995 | A * | 11/1999 | Hykes | B24B 19/12 |
| | | | | 451/10 |
| 6,015,336 | A * | 1/2000 | Kubota | B24B 19/08 |
| | | | | 451/246 |
| 2007/0180694 | A1* | 8/2007 | Burgler | B23P 9/02 |
| | | | | 29/888.1 |
| 2008/0194186 | A1 | 8/2008 | Himmelsbach | |
| 2009/0199795 | A1* | 8/2009 | Eberhard | B21K 25/00 |
| | | | | 123/90.6 |
| 2012/0138009 | A1* | 6/2012 | Petry-Johnson | F01L 1/026 |
| | | | | 123/195 R |
| 2013/0045665 | A1* | 2/2013 | Schmitz | B24B 27/0076 |
| | | | | 451/160 |
| 2016/0045996 | A1* | 2/2016 | Schmitz | B24B 27/0076 |
| | | | | 451/160 |

FOREIGN PATENT DOCUMENTS

| | | | | |
|---|---|---|---|---|
| DE | 102005034777 B3 | 3/2007 | | |
| EP | 2354477 A2 | 8/2011 | | |
| GB | 2144355 A * | 3/1985 | ............ | B24B 19/12 |
| GB | 2277361 A | 10/1994 | | |
| JP | 1-306166 A | 12/1989 | | |
| JP | 5-337806 A | 12/1993 | | |
| JP | H 06-106410 A | 4/1994 | | |
| JP | 2003-165011 | 6/2003 | | |
| WO | 2013053669 A1 | 4/2013 | | |

* cited by examiner

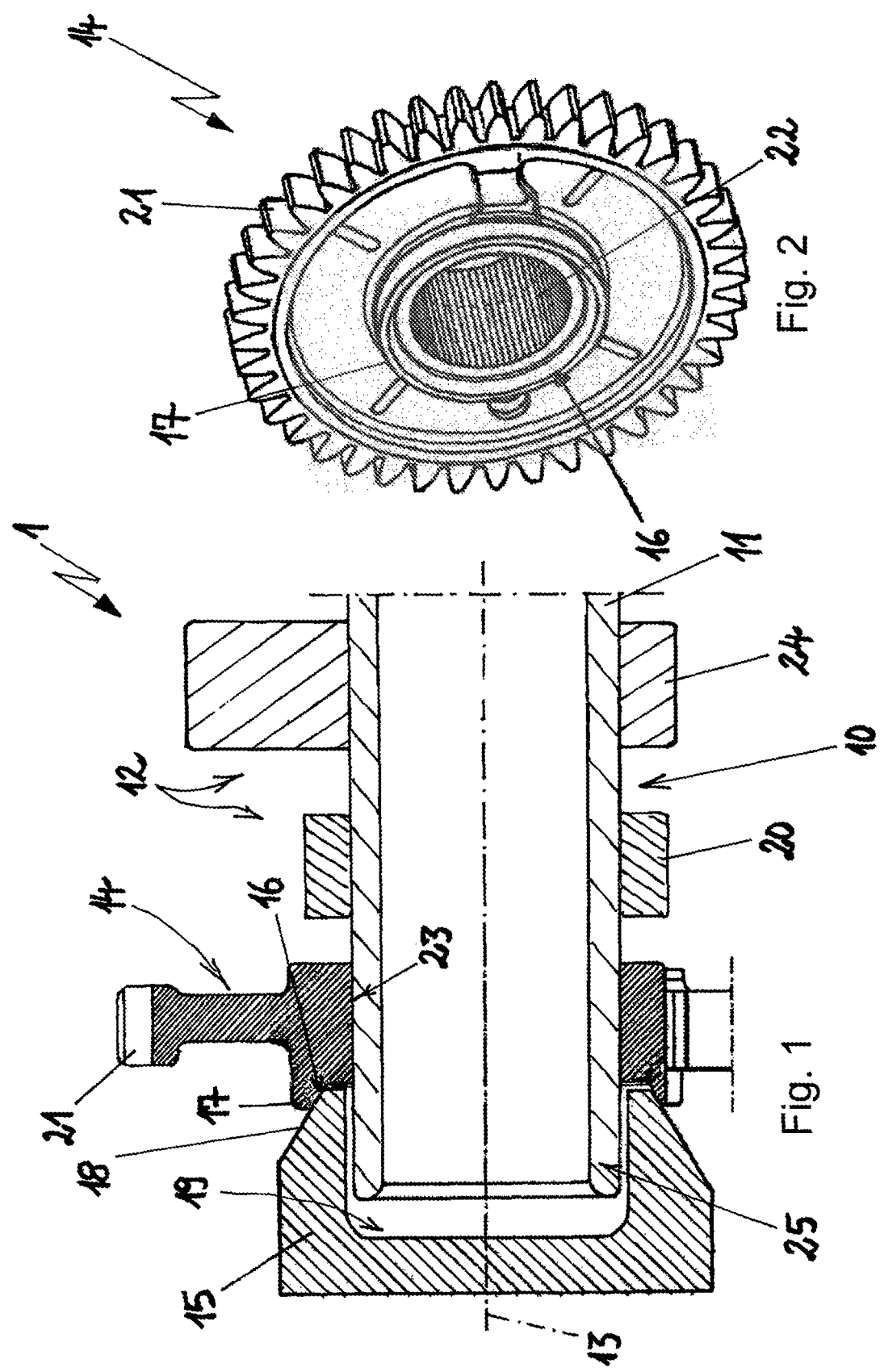

ACCOMMODATING ASSEMBLY FOR THE GRINDING OF A CAMSHAFT AND METHOD FOR GRINDING THE CAMSHAFT

CROSS REFERENCE TO RELATED APPLICATIONS

This application is a U.S. National Stage Entry of International Patent Application Serial Number PCT/EP2014/003220, filed Dec. 3, 2014, which claims priority to German Patent Application No. DE 102013113444.0 filed Dec. 4, 2013, the entire contents of both of which are incorporated herein by reference.

FIELD

The present disclosure relates to camshafts and, more particularly, to receiving arrangements and methods for machining camshafts.

BACKGROUND

DE 10 2005 034 777 B3 presents a camshaft which can be received in a receiving arrangement, such that the camshaft can be subjected, in a receiving arrangement, to a grinding machining process. Here, a shaft body is proposed, on which functional elements of the camshaft and a gearwheel are mounted, and it is specified that the functional elements, in particular an interference-fit bearing seat, can be produced in one grinding machining process. It is however a disadvantage that the shrink-fitting of the gearwheel onto the shaft body results in a position error of the toothing of the gearwheel relative to the machined interference-fit bearing seat. In a single chucking set-up of the camshaft, mutually accurate grinding machining can be realized only between the interference-fit bearing seat and the functional elements, for example a cam element. However, since the production of the toothing of the gearwheel takes place before the shrink-fitting of the gearwheel onto the shaft body, it is not possible to adhere to narrow position tolerances and true running accuracy between the toothing of the gearwheel on the shaft body and the pressing bearing seat and other functional elements. This often gives rise to relatively short service lives of the gearwheels of camshafts, or the simple pressing of gearwheels onto the shaft body in order to produce the camshaft is often not possible, because the pressing gives rise to excessively large position deviations between the toothing of the gearwheel and the functional elements produced by way of a grinding machining process, such as bearing elements and cam elements.

BRIEF DESCRIPTION OF THE FIGURES

FIG. 1 is a cross-sectional view of an example receiving arrangement for receiving a camshaft.

FIG. 2 is a perspective view of an example gearwheel having a toothing and a shaft passage for being received on a shaft body of a camshaft.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present disclosure generally involves receiving arrangements for camshafts that have a shaft body with functional elements that extends along an axis of rotation and a gearwheel mounted on the shaft body. A receiving body may be provided by way of which the camshaft can be at least partially received for the purposes of performing a grinding machining process. The present disclosure also relates to methods for the grinding machining of a camshaft by way of a receiving arrangement of said type. The present disclosure further relates to a camshaft that can be received in a receiving arrangement.

It is an object of the invention to improve a receiving arrangement in order to overcome the disadvantages described above. In particular, the receiving arrangement should be of simple design and permit a high level of position accuracy between the gearwheel mounted on the shaft body and the functional elements. Furthermore, it is sought to specify a method for the grinding machining of a camshaft in a receiving arrangement of said type, which method yields an accurate position tolerance of the toothing of the gearwheel relative to the functional elements. Consequently, it is also the object of the invention to specify a camshaft which can be received and machined in a receiving arrangement of said type and by way of a method of said type.

The invention encompasses the technical teaching whereby the gearwheel has a receiving means, onto which the receiving body can be engaged and by way of which it is made possible for the camshaft to be received by the receiving body.

By means of the receiving arrangement according to the invention for receiving a camshaft, it is made possible to perform grinding machining of the camshaft, which results in minimal concentricity errors and position tolerances between the toothing of the gearwheel and the functional elements. The receiving means on the gearwheel can form a geometric grinding center, which may already have served as a grinding center for the production of the toothing during the production of the gearwheel, or which is at least jointly produced during the production of the toothing, in particular in one machining chucking set-up. In a variant in which the gearwheel is produced as a sintered component, the receiving means may serve in the same way as a reference geometry, which likewise has a correspondingly high accuracy with respect to the toothing and is formed, in the sintering process, with narrow tolerances with respect to the geometry of the receiving means.

Here, the gearwheel may also or alternatively perform other or further functions, and may for example serve as a sensor wheel or be in the form of a sprocket or belt pulley. In the context of the present invention, the gearwheel need not be formed in one piece, and the receiving means may for example also be formed on a sleeve which is pressed together with the gearwheel.

If the camshaft is at least partially received by way of the receiving means on the gearwheel, and if at least one of the functional elements in said receptacle is machined by grinding, then the grinding center for the production of the toothing and the grinding center for the grinding machining of the functional elements coincide, giving rise to minimal concentricity errors of the toothing of the gearwheel relative to the functional elements.

The receiving means may be formed by a collar with a conical recess shape form, wherein the collar is integrally formed on the gearwheel at the hub side and concentrically about the axis of rotation. Here, the receiving body may have a receiving formation which is of complementary form to the conical recess of the collar and which can be engaged onto the conical recess of the collar, and which thus forms encircling areal contact. Here, the receiving body may surround the receiving means or be inserted into the receiving means, wherein both possibilities yield the desired result whereby the camshaft is at least partially received by the receiving body. It is also possible for the receiving means or the receiving body to have an encircling edge, for example a bevel, which bears against the conical contour at the inside or outside and thus forms linear contact.

The fact that the camshaft is only partially received arises from the fact that, during a grinding machining process of a camshaft, the latter must basically be received, so as to be rotatable about its axis of rotation, by way of at least two centering tips, analogously to the principle of a clamping chuck and a tailstock sleeve of a turning machine. Here, the receiving body replaces one of the centering tips, and the camshaft is received, by way of the receiving body, on the receiving means of the gearwheel, wherein a further receptacle may be provided on the other end of the camshaft. Here, it is firstly possible for the conical recess to be formed at the inside in the collar, or the conical recess may be formed on the collar at the outside. The receiving body may be of correspondingly complementary form, and the receiving body may comprise an internal cone or an external cone. Here, the alternative embodiment of the receiving means is basically also in the form of an internal cylindrical surface or external cylindrical surface, and the receiving body comprises an external cylindrical surface of complementary form or an internal cylindrical surface, wherein a receiving fit must have correspondingly narrow tolerances. In the same way, the recess may also be formed by a spherical contour.

In a refining embodiment, the shaft body may, in terms of its longitudinal extent in the direction of the axis of rotation, protrude axially beyond the position of the gearwheel on said shaft body, such that the gearwheel is received on the shaft body so as to be spaced apart from the axial end of said shaft body.

Consequently, the receiving body may be formed, at least in sections, with a cavity which is open at the end side and in which the end of the shaft body can be received. In particular in the case of protruding shaft ends, it has hitherto only been possible for camshafts to be received, by means of a centering tip for the grinding machining process, by way of the shaft body. This however yields a concentricity error of the toothing of the gearwheel on the shaft body, because the connection of the gearwheel to the shaft body is commonly in the form of an interference fit, giving rise to increased position tolerances. Owing to the special design of the receiving body with a cavity, it is however achieved, despite a protruding shaft end, that the camshaft is received by way of the receiving means on the gearwheel, such that the receiving arrangement according to the invention can be implemented even in the case of camshafts with protruding shaft ends.

It is furthermore advantageously possible for the camshaft to be in the form of an assembled camshaft, wherein the shaft body, the gearwheel and preferably also the functional elements are formed as individual parts and are joined onto the shaft body. Alternatively, it is however also possible for the camshaft to be produced as a solid camshaft, onto which the gearwheel is retroactively mounted, and for a grinding machining process of the functional elements of the camshaft, which are formed in one piece and materially integrally with the shaft body, to be performed in the same way by way of the receiving arrangement according to the invention.

The invention also relates to a method for the grinding machining of a camshaft in a receiving arrangement for receiving the camshaft, wherein the camshaft comprises a shaft body with functional elements, which shaft body extends along an axis of rotation, and wherein a gearwheel is mounted on the shaft body. Here, the method comprises at least the steps of providing a receiving body for at least partially receiving the camshaft, providing the gearwheel, which has a receiving means, receiving the camshaft by engaging the receiving body onto the receiving means, and grinding the at least one functional element. The engagement of the receiving body on the receiving means may in this case be realized in particular by virtue of the receiving body being inserted, with centering action, into the receiving means.

The gearwheel may be provided with a toothing, wherein the receiving means and the toothing are produced with a common geometrical machining center, and wherein the gearwheel is only subsequently pressed or shrink-fitted onto the shaft body.

The invention is also directed to a camshaft having a shaft body comprising multiple functional elements, wherein the shaft body extends along an axis of rotation, and wherein a gearwheel is mounted on the shaft body, and it is provided that the gearwheel has a receiving means into which a receiving body can be engaged and by way of which it is made possible for the camshaft to be received by the receiving body, so as to provide a receiving arrangement for the grinding machining of at least one of the functional elements. Here, the engagement of the receiving body onto the receiving means may be realized in particular by virtue of the receiving body being inserted into, or engaging around, the receiving means.

The receiving means may advantageously be formed by a collar with a conical recess shape form, wherein the collar is integrally formed on the gearwheel at the hub side and concentrically around the axis of rotation. Alternatively, the collar may form a conical formation, and the receiving body may have a conical recess of correspondingly complementary form, such that alternatively, the receiving body may engage around the conical formation of the collar, whereby it is likewise the case that the camshaft can be received in the grinding center of the toothing of the gearwheel.

According to a further advantageous embodiment of the camshaft, the shaft body may, in terms of its longitudinal extent in the direction of the axis of rotation, protrude axially beyond the position of the gearwheel on the shaft body, such that the gearwheel is received on the shaft body so as to be spaced apart from the axial shaft end of said shaft body. The camshaft may be in the form of an assembled camshaft, wherein the shaft body, the gearwheel and preferably also the functional elements are formed as individual parts and are joined together.

FIG. 1 shows an exemplary embodiment of a receiving arrangement 1 having an exemplary embodiment of a camshaft 10, and the method according to the invention for the grinding machining of the camshaft 10 can be performed by means of the exemplary embodiment of the receiving arrangement 1 that is shown.

The camshaft 10 is only partially shown, and comprises a shaft body 11 which is in the form of a hollow shaft, and by way of example, two functional elements 12 are arranged on the shaft body 11. A first functional element 12 forms a bearing element 20 for the mounting of the camshaft 10 in the cylinder head of an internal combustion engine, and a further functional element 12 is, for example, in the form of a cam element 24. The bearing element 20 is shown, by way of example, as a single ring-shaped element that has been pushed onto the shaft body 11, and the bearing element 20 may also be formed by a section of the shaft body 11. For example, the section of the shaft body 11, and also the outer circumferential surface of the bearing element 20 or of the cam element 24, may be subjected to a grinding machining process in order for the camshaft 10 to be mounted, so as to be rotatable about the axis of rotation, in associated bearing shells in the cylinder head of the internal combustion engine.

As a further element, a gearwheel 14 is mounted on the shaft body 11, and the gearwheel 14 is fastened to the shaft body 11 by way of an interference fit 23. The gearwheel 14 may serve for example for the drive of the camshaft 10 or for the rotatable coupling of a further camshaft, and the gearwheel 14 has a toothing 21 which forms the termination of the gearwheel 14 at the outer circumference. The gearwheel 14 has, in this case, a seat on the shaft body 11, said seat being axially spaced apart from the shaft end 25 in the direction of the axis of rotation 13. Consequently, the shaft end 25 protrudes axially, in the direction of the axis of rotation 13, beyond the seating position of the gearwheel 14 on the shaft body 11.

The receiving arrangement 1 is formed by a receiving body 15 for receiving the camshaft 10, and the receiving body 15 may for example be a constituent part of a grinding machining center, and is shown merely in schematic form. The receiving body 15 has a receiving formation 18 which interacts with a receiving means 16, such that the camshaft 10 is at least partially received, so as to be rotatable about the axis of rotation 13, by way of the receiving body 15. The fact that the camshaft 10 is only partially received arises from the fact that a further receptacle for the camshaft 10 is provided along the axis of rotation 13, for example at the opposite end with respect to the shaft end 25 of the shaft body 11, in a manner which is not shown, and the further receptacle may for example be in the form of a turning center (turning tip), in particular in the form of a sleeve.

In order that the shaft end 25 which protrudes beyond the position of the gearwheel 14 does not impede the receiving of the camshaft 10 by way of the receiving body 15, the receiving body 15 has a cavity 19 which is geometrically designed such that the shaft end 25 protrudes into the receiving body 15, in particular without making physical contact.

The receiving means 16 on the gearwheel 14 is formed by an integrally formed collar 17 with a conical internal recess shape form, and the collar 17 is situated on the gearwheel 14 at the hub side and concentrically about the axis of rotation 13. Here, the collar 17 is formed in one piece with the body of the gearwheel 14, wherein the conical recess for forming the receiving means 16 is produced in a common machining process together with the cutting production of the toothing 21. Consequently, the receiving means 16 in the collar 17 in the form of the conical recess forms the geometrical grinding machining center of the gearwheel 14, such that the toothing 21 has a minimal concentricity error with respect to the receiving means 16.

The receiving formation 18 on the receiving body 15 is formed complementarily to the conical recess in the collar 17, and it is possible in particular for the cone with an external surface of the receiving formation 18 to have the same angle as the cone in the receiving means 16 on the gearwheel 14. In this way, the gearwheel 14 and in particular the toothing 21 can be received on the receiving body 15 with an only minimal concentricity error.

If, in the receiving arrangement 1 that is shown, at least one of the functional elements 12, in particular the bearing element 20 or the outer circumferential surface of the shaft body 11, is subjected to a grinding machining process, it is thus ensured that an only minimal concentricity error arises between the toothing 21 and the surface, which is subjected to grinding machining, of the functional element 12 or the outer circumferential surface of the shaft body 11. As a result, during subsequent use of the camshaft 10, the toothing 21 has minimal tolerance deviations relative to at least one surface, machined by cutting action, of one of the functional elements 12 or relative to the outer circumferential surface of the shaft body 11.

FIG. 2 shows, in a perspective view, the gearwheel 14 with the toothing 21 on the outer circumference and with the laterally formed receiving means 16 within a collar 17, wherein the collar 17 is formed in one piece with, and integrally on, the body of the gearwheel 14. At the inside, the gearwheel 14 has a shaft passage 22, and, by way of example, a grooved surface is shown by way of which the gearwheel 14 can be pressed onto the shaft body 11, and the grooved surface may for example form a toothing along the axis of rotation 13 or along the central axis of the gearwheel 14.

In a process of production of the gearwheel 14, which may for example be a cutting, in particular grinding process, the machining of the receiving means 16 is performed in a common chucking set-up together with the production of the toothing 21, and consequently, the receiving means 16 forms a grinding center for the toothing 21, and the formed grinding center in the form of the receiving means 16 serves, for the subsequent grinding machining of the camshaft 10 with the gearwheel 14 pressed onto the shaft body 11, as the reference grinding center for the grinding machining of at least one of the functional elements 12. If the gearwheel 14 is produced as a sintered component, the receiving means 16 may, owing to the sintering process, already exhibit very narrow tolerances relative to the toothing 21 of the gearwheel 14.

The invention is not restricted, in terms of its embodiment, to the preferred exemplary embodiment specified above. Rather, numerous variants are conceivable which make use of the illustrated solution even in embodiments of fundamentally different form. All of the features and/or advantages that emerge from the claims, from the description or from the drawings, including design details or spatial arrangements, may be essential to the invention both individually and in a wide variety of combinations.

What is claimed is:

1. A combination of a workpiece, a workpiece holder, and a gearwheel, the combination comprising:
   a camshaft configured as the workpiece, the camshaft including a shaft body that extends along an axis of rotation and includes functional elements;
   the gearwheel, which is mounted to the shaft body of the camshaft, the gearwheel including receiving means and teeth, wherein the receiving means of the gearwheel comprises a collar with an annular conical recess that is inward facing with respect to the gearwheel, wherein the collar is integral with the gearwheel and concentrically positioned about the axis of rotation; and
   a receiving body configured as the workpiece holder, wherein the camshaft is at least partially received in the receiving body, wherein the receiving body is disposed farther from an axial midpoint of the shaft body than the gearwheel, wherein the receiving means of the gearwheel is engaged with the receiving body, wherein the receiving body comprises a receiving formation that is of a complimentary form to the annular conical recess of the collar of the gearwheel and which is engageable onto the annular conical recess of the collar.

2. The combination of claim 1 wherein a longitudinal extent of the shaft body in a direction of the axis of rotation protrudes axially beyond a position of the gearwheel on the shaft body such that the gearwheel is spaced apart from an axial end of the shaft body, the axial end of the shaft body being disposed within the receiving body.

3. The combination of claim 1 wherein an end of the receiving body comprises a cavity, wherein an end of the shaft body is received in the cavity of the receiving body.

4. The combination of claim 1 wherein at least one of the functional elements is a bearing element.

5. The combination of claim 1 wherein the collar on the gearwheel extends away from the axial midpoint of the shaft body towards the receiving body.

6. The combination of claim 1 wherein an end of the shaft body proximal the receiving body protrudes axially beyond an entirety of the gearwheel such that the gearwheel is spaced axially apart from the end of the shaft body proximal the receiving body.

7. The combination of claim 1 wherein the receiving body encircles and encloses an end of the shaft body.

8. The combination of claim 1 wherein at least a portion of the receiving body is spaced axially apart from an end of the shaft body proximal the receiving body.

9. The combination of claim 1 wherein a first portion of the receiving body protrudes axially away from the shaft body and a second portion of the receiving body overlaps axially with the shaft body.

10. The combination of claim 1 wherein the collar is disposed on a side of the gearwheel that faces away from the axial midpoint of the shaft body.

11. The combination of claim 1 wherein the gearwheel includes a through-hole, wherein the camshaft extends through the through-hole of the gearwheel and at least partially into the receiving body.

12. The combination of claim 1 wherein the teeth extend about an entirety of a circumference of the gearwheel.

13. A workpiece and holder combination comprising:
a workpiece having a shaft body including functional elements, wherein the shaft body extends along an axis of rotation; and
a gearwheel having teeth mounted on the shaft body, the gearwheel having a receiving means that is engageable with a workpiece holder receiving body and that permits the camshaft to be received by the workpiece holder receiving body, wherein the receiving means of the gearwheel comprises a collar with an annular conical recess that is inward facing with respect to the gearwheel, wherein the collar is integral with the gearwheel and concentrically positioned about the axis of rotation,
wherein the workpiece holder receiving body serves as a workpiece receiving arrangement during grinding machining of at least one of the functional elements, wherein the receiving body comprises a receiving formation that is of a complimentary form to the annular conical recess of the collar of the gearwheel and which is engageable onto the annular conical recess of the collar.

14. The combination of claim 13 wherein the collar is formed integrally on the gearwheel at a hub side and positioned concentrically around the axis of rotation.

15. The combination of claim 13 wherein a longitudinal extent of the shaft body in a direction of the axis of rotation protrudes axially beyond a position of the gearwheel on the shaft body such that the gearwheel is received on the shaft body and is spaced apart from an axial shaft end of the shaft body.

16. The combination of claim 13 in the form of an assembled camshaft, wherein the shaft body, the gearwheel, and the functional elements are formed separately and then joined together.

* * * * *